United States Patent Office 3,558,696
Patented Jan. 26, 1971

3,558,696
PRODUCTION OF α,β-DIHALOACRYLIC
ACIDS OR THEIR SALTS
Franz Reicheneder, 5 Homburger Strasse,
Ludwigshafen (Rhine), Germany
No Drawing. Filed July 18, 1967, Ser. No. 654,059
Claims priority, application Germany, July 28, 1966,
P 15 68 152.4
Int. Cl. C07c 57/06
U.S. Cl. 260—539                                6 Claims

ABSTRACT OF THE DISCLOSURE

A process for the production of α,β-dihaloacrylic acids or their salts in which dihalomaleic acids or their anhydrides, acid salts, esters or hemiesters are heated in the presence of inert solvents to temperatures of 110° to 180° C. The α,β-dihaloacrylic acids are used for the production of pharmaceuticals.

This invention relates to a process for the production of α,β-dihaloacrylic acids or their salts from dihalomaleic acids or their anhydrides, acid salts, esters or hemiesters.

It is known from Berichte der Deutschen Chemischen Gesellschaft, volume 12 (1879), page 656 that α,β-dichloroacrylic acid is obtained by treatment of mucochloric acid with aqueous alkali solutions. α,β-dichloroacrylic acid is obtained according to Berichte der Deutschen Chemischen Gesellscraft, volume 24 (1881), page 918 by treatment of 1,2,4,4-tetrachlorocyclopentene-(1)-dione-(3,5) with aqueous caustic soda solution. Furthermore, the production of α,β-dibromoacrylic acid by hydrolysis of α,α,β-tribromopropionic acid with baryta water is described in Berichte der Deutschen Chemischen Gesellschaft, volume 14 (1881), page 1676. Moreover it is known from German patent specification No. 261,689 that α,β-dichloroacrylic acid is obtained by treating 1,1,2,3,3-pentachloropropene with concentrated sulfuric acid. According to other methods described in Berichte der Deutschen Chemischen Gesellschaft volume 15 (1882), page 2703, and volume 18 (1885), page 2284, α,β-dihaloacrylic acids are obtained by adding on halogen to propiolic acid. According to another method described in Berichte der Deutschen Chemischen Gesellschaft, volume 16 (1883), page 2397, α,β-dicholoracrylic acid can be obtained by heating dichloromaleic acid imide in the presence of water. All the methods described have the disadvantage that they have to start from materials which are difficult to prepare.

It is an object of this invention to provide a process for the production of α,β-dihaloacrylic acids or their salts in which easily accessible dihalomaleic acids or acid salts, anyhrydrides, esters or hemiesters thereof are used as starting materials. It is a further object of the invention to provide a process in which the reaction is carried out at relatively low temperatures.

In accordance with this invention, the said and other objects are achieved by heating an α,β-diralomaleic acid or an anhydride, acid salt, ester or hemiester thereof at temperatures of 110° to 180° C. in the presence of an inert solvent.

This is remarkable because it is known from German patent specification No. 1,179,929 that maleic hemiesters form acrylic acid esters at low temperatures only in the presence of catalysts. Moreover it was not to be expected that α,β-dihalomaleic acids would decompose at elevated temperature into α,β-dihaloacrylic acids because in the Journal of the American Society, volume 36 (1914) page 1904 it is stated that when diiodomaleic acid is heated to 100° C. in the presence of water, diiodoacetic acid and other compounds are formed.

The preferred starting materials are dichloromaleic acid, dibromomaleic acid or diiodomaleic acid and their anhydrides or acid salts with metals of groups 1 and 2 of the Periodic System, such as sodium, potassium, calcium or magnesium, particularly sodium or potassium, and their esters or hemiesters with alcohols having one to twelve carbon atoms. Alkanols having one to eight, particularly one to four, carbon atoms are especially preferred alcohols. Dihalomaleic acids having mixed halogen atoms are also suitable for the reaction. Examples of compounds which are suitable for the reaction are dichloromaleic acid, monomethyl dibromomaleate, dimethyl dichloromaleate, diiodomaleic anhydride and monosodium dichloromaleate. Dihalomaleic acids are obtained in a simple manner by reaction of maleic acid with halogen in the presence of iron (III) chloride at 180° C. Diiodomaleic acid is advantageously prepared from dichloromaleic acid or dibromomaleic acid by exchange of halogen.

The reaction according to the invention is carried out in the presence of a solvent which is inert under the reaction conditions. Examples of preferred inert solvents are water and alcohols, particularly alkanols having one to eight carbon atoms, such as methanol and ethanol; ethers having two to eight carbon atoms, such as tetrahydrofuran; ketones having three to eight carbon atoms, such as acetone and methyl ethyl ketone; nitriles having two to seven carbon atoms, such as acetonitrile; and dimethyl sulfoxide. It is particularly advantageous to use water as the solvent. In general 100 to 5000 g., preferably 200 to 1000 g., of solvent is used for each mole of dihalomaleic acid or anhydride, acid salt, ester or hemiester thereof.

The reaction proceeds at temperatures of from 110° to 180° C. It is advantageous to use temperatures of from 120° to 140° C. The pressure is set up by the carbon dioxide eliminated and by the vapor pressure of the solvent corresponding to the temeprature. It is possible to remove cabron dioxide from the reactor during the reaction in order to carry out the reaction at a lower pressure.

The process according to the invention may be carried out for example by charging a corrosion-resistant pressure vessel with a dihalomaleic acid (or anhydride, acid salt, ester or hemiester thereof) together with the stated amount of solvent and heating the mixture to the said temperatures so that an autogenous pressure is set up. Reaction is usually completed after four to eight hours. In order that less expensive pressure vesesls may be used, it is advantageous to lower the pressure by expansion during the reaction so that it is equivalent to the vapor pressure of the solvent at the temeprature concerned. After the pressure vessel has been cooled, the pressure is released and the dihaloacrylic acid or salt thereof is isolated by conventional methods, for example by filtration. If the compound formed is in liquid form, it may be freed from solvent, for example by decantation or distillation.

Compounds obtainable by the process of the invention are suitable for the production of pharmaceuticals. For example, if α,β-dichloroacrylic acid is reacted with benzamidine to form 2-phenyl-4-hydroxy-5-chloropyrimidine and the hydroxy group is then replaced by an amino group, an antiphlogistic compound is obtained.

The invention is illustrated by the following examples in which parts are by weight.

EXAMPLE 1

200 parts of dichloromaleic anhydride is heated with 500 parts of water in a corrosion-resistant pressure vessel for six hours at 130° C. A pressure of 20 atmospheres gauge is set up during the reaction. The vessel is cooled, the pressure is released and the precipitate is isolated by filtration and recrystallized from water. 138 parts (82.5% of the theory) of α,β-dichloroacrylic acid is obtained having a melting point of 85° to 86° C.

Analysis.—Calculated for $C_3H_2O_2Cl_2$ (percent): C, 25.5; H, 1.42; O, 22.7; Cl, 50.3. Found (percent): C, 26.0; H, 1.5; O, 23.0; Cl, 50.1.

EXAMPLE 2

10 parts of dibromomaleic acid is heated together with 50 parts of water in an acid-resistant pressure vessel for six hours at 120° C. Then the vessel is cooled and the pressure released. An oil is obtained by decantation which crystallizes when heated to 70° C. in vacuo. After it has been recrystallized from water, 7.2 parts (85.7% of the theory) of α,β-dibromoacrylic acid is obtained having a melting point of 83° to 85° C.

Analysis.—Calculated for $C_3H_2O_2Br_2$ (percent): C, 15.65; H, 0.87; Br, 69.5. Found (percent): C, 15.9; H, 1.1; Br, 69.4.

EXAMPLE 3

10 parts of diiodomaleic acid and 50 parts of water are treated and worked up as described in Example 1. 6.5 parts (73.9% of the theory) of α,β-diiodoacrylic acid is obtained having the melting point 102° to 104° C.

Analysis.—Calculated for $C_3H_2O_2I_2$ (percent): C, 11.1; H, 0.62; I, 78.4. Found (percent): C, 11.3; H, 0.5; I, 78.0.

EXAMPLE 4

11 parts of dichloromaleic acid is dissolved in 20 parts of water and converted into the acid salt of dichloromaleic acid by adding 2.4 parts of sodium hydroxide. The solution is then heated for six hours at 120° C. in a corrosion-resistant pressure vessel and cooled. The equivalent amount of sulfuric acid is added to the solution. Dichloroacrylic acid separates out. 7 parts (92.1% of the theory) of α,β-dichloroacrylic acid having a melting point of 83° to 85° C. is obtained after filtration.

EXAMPLE 5

15 parts of dimethyl dichloromaleate is heated in a mixture of 30 parts of water and 20 parts of methanol for six hours at 120° C. in an acid-resistant pressure vessel and cooled. The water is decanted off and the oily residue is heated at 70° C. in vacuo so that it crystallizes. It is recrystallized from water. 8 parts (80.6% of the theory) of α,β-dichloroacrylic acid is obtained having a melting point of 82° to 84° C.

EXAMPLE 6

10 parts of dimethyl dichloromaleate is heated with 50 parts of water and 2 parts of sodium hydroxide in a pressure vessel for six hours at 120° C. The solution is cooled and acidified with sulfuric acid and then extracted with ether. After the solvent has been distilled off, 4 parts of α,β-dichloroacrylic acid is obtained (60.4% of the theory).

EXAMPLE 7

4 parts of chloroiodomaleic acid is heated with 50 parts of water for six hours at 120° C. in an acid-resistant pressure vessel. The whole is then cooled, the solution is extracted with ether, and the solvent is evaporated from the ethereal solution. 5 parts (59.5% of the theory) of chloroiodoacrylic acid is obtained having a melting point of 67° to 69° C.

Analysis.—Calculated (percent): Cl, 12.25. Found (percent): Cl, 12.70.

I claim:
1. A process for the production of α,β-dihaloacrylic acids or salts thereof which comprises heating an α,β-dihalomaleic acid selected from the group consisting of dichloromaleic acid, dibromomaleic acid, and diiodomaleic acid, or its anhydride, acid salt with a metal selected from the group consisting of sodium, potassium, calcium, and magnesium, ester or hemiester with an alcohol having one to twelve carbon atoms, in the presence of an inert solvent at a temperature of from 110° to 180° C.

2. A process as claimed in claim 1 wherein the acid salts of α,β-dihalomaleic acids with potassium or sodium are used as starting materials.

3. A process as claimed in claim 1 wherein an α,β-dihalomaleic ester of an alkanol having one to eight carbon atoms is used as starting material.

4. A process as claimed in claim 1 wherein water, an alcohol having one to eight carbon atoms, an ether having two to eight carbon atoms, a ketone having three to eight carbon atoms, a nitrile having two to seven carbon atoms, or dimethyl sulfoxide is used as the solvent.

5. A process as claimed in claim 1 wherein water is used as the solvent.

6. A process as claimed in claim 1 wherein the temperature used is from 120° to 140° C.

References Cited

Noller: Chemistry of Organic Compounds, pp. 786–787.

LORRAINE A. WEINBERGER, Primary Examiner

P. J. KILLOS, Assistant Examiner

U.S. Cl. X.R.

260—485, 486

PO-1050
(5/69)

UNITED STATES PATENT OFFICE
CERTIFICATE OF CORRECTION

Patent No. 3,558,696        Dated January 26, 1971

Inventor(s) Franz Reicheneder

It is certified that error appears in the above-identified patent and that said Letters Patent are hereby corrected as shown below:

Column 1, line 5, in the heading, after "Germany" insert -- assignor to Badische Anilin- & Soda-Fabrik Aktiengesellsc Ludwigshafen (Rhine), Germany --; line 32, "Gesellcraft" should read -- Gesellschaft --; line 61, "$\alpha,\beta$-diralomaleic" should read -- $\alpha,\beta$-dihalomaleic --.

Signed and sealed this 17th day of August 1971.

(SEAL)
Attest:

EDWARD M. FLETCHER, JR.
Attesting Officer

WILLIAM E. SCHUYLER, JR.
Commissioner of Patents